United States Patent [19]

Geddes et al.

[11] Patent Number: 5,048,470
[45] Date of Patent: Sep. 17, 1991

[54] ELECTRONICALLY TUNED INTAKE MANIFOLD

[75] Inventors: Earl R. Geddes, Livonia; Todd A. Gross, Dearborn Hts., both of Mich.

[73] Assignee: Ford Motor Company, Dearborn, Mich.

[21] Appl. No.: 633,734

[22] Filed: Dec. 24, 1990

[51] Int. Cl.$^5$ ............................................. F02M 35/10
[52] U.S. Cl. ................................................. 123/52 MB
[58] Field of Search ......... 123/52 M, 52 MB, 52 MC, 123/52 MV

[56] References Cited

U.S. PATENT DOCUMENTS

| | | | |
|---|---|---|---|
| 4,206,607 | 6/1980 | Heberle et al. | 60/611 |
| 4,461,248 | 7/1984 | McFarland | 123/52 M |
| 4,563,997 | 1/1986 | Aoki | 123/559.1 |
| 4,644,783 | 2/1987 | Roberts et al. | 73/116 |
| 4,715,353 | 12/1987 | Koike et al. | 123/590 |
| 4,796,595 | 1/1989 | El-Nashar et al. | 123/559.2 |
| 4,798,049 | 1/1989 | Mayer | 60/276 |
| 4,808,082 | 2/1989 | Kirchhofer et al. | 417/64 |
| 4,838,234 | 6/1989 | Mayer | 123/559.2 |
| 4,848,281 | 7/1989 | McCord | 123/52 M |
| 4,910,959 | 3/1990 | Dones | 60/280 |

FOREIGN PATENT DOCUMENTS

| | | |
|---|---|---|
| 0065315 | 11/1982 | European Pat. Off. ........ 123/73 A |
| 2490786 | 3/1982 | France . |
| 1495015 | 12/1977 | United Kingdom . |

Primary Examiner—David A. Okonsky
Attorney, Agent, or Firm—Clifford L. Sadler; Jerome R. Drouillard

[57] ABSTRACT

An electronically controlled intake manifold system for an internal combustion engine includes an intake manifold for conveying charge air to each of the cylinders of the engine, an electronically driven pressure pulse generator operatively connected with the manifold for the purpose of producing pressure pulses within the manifold at one or more frequencies related to an operating parameter of the engine, and a processor using at least one operating parameter of the engine to generate a signal for driving the pressure pulse generator.

25 Claims, 1 Drawing Sheet

ELECTRONICALLY TUNED INTAKE MANIFOLD

BACKGROUND OF THE INVENTION

1. Field of the Invention

This invention relates to a method and system for supercharging or subcharging an internal combustion engine without the need for rotating machinery. The electronically controlled system disclosed herein offers the flexibility of controlling the supercharger according to a variety of engine operating parameters.

2. Disclosure Information

Internal combustion engines, commonly of the reciprocating type, and most often in the form of spark ignition or so-called premixed charge engines or compression ignition commonly referred to as diesel engines, have in certain instances been equipped with supercharging devices for many years. Such superchargers have taken the form of gear driven devices, such as the well known Roots blower used with certain two-stroke cycle diesel engines, such as the Detroit diesel, and also with such spark ignition engines as such as that used in certain pre World War II Bentley automobiles. Mechanical superchargers have lately been used in certain Ford Motor Company vehicles. In any form, such mechanical devices are limited by the need to drive the device by means of an inextensible member, such as gearing or by a belt or chain. This, of course, limits the ability to control the speed and the boost ratio or other operating characteristics of the device.

Another aspect of conventional supercharging is so-called pulse supercharging. Pulse superchargers are typically rotating machines which have been controlled according to a variety of schemes.

U.S. Pat. No. 4,206,607 to Heberle et al., U.S. Pat. No. 4,563,997 to Aoki, U.S. 4,796,595 to El-Nashar et al., U.S. Pat. No. 4,798,049 to Mayer, U.S. Pat. No. 4,808,082 to Kirchhofer et al., U.S. Pat. No. 4,838,234 to Mayer and U.S. Pat. No. 4,910,959 to Dones all disclose rotating pressure wave superchargers. As with other types of rotating superchargers, certain losses are engendered by the need for bearings and other rotating components. Pressure wave superchargers produce a pulsating pressure in the intake manifold of the engine. The frequency of the pulsations is a function of the speed of rotation of the device. Controlling the speed of the rotation is somewhat difficult with a mechanically driven device, and even more difficult with a free-running device. An electronically controlled intake manifold having a supercharging device according to the present invention overcomes these problems with control because an electronically driven transducer can be operated at a frequency which is essentially independent of the speed of operation of the engine.

Transducers controlled by electronic circuitry have been employed for the purpose of influencing combustion in steady flow reactors, such as oil burners. British Patent Specification 1 495 015 to Swithenbank et al., French Patent Specification 2 490 786 to Bertrand and U.S. Pat. No. 4,644,783 to Roberts et al. all disclose steady flow, constant pressure, combustion chambers in which acoustic noise is sensed for the purpose of controlling the flow of reactants to a flame. None of the systems disclosed in these patents is directed to the supercharging of air running through the inlet manifold of an internal combustion engine.

U.S. Pat. No. 4,715,353 discloses an ultrasonic wave fuel atomizing apparatus which is not described as producing a supercharging effect.

Another aspect of the present invention relates to the concept of subcharging, in which the effective pressure within the intake manifold is depressed to a subatmospheric level in the region of the intake ports. This mode of charge air control may be desirable during engine idle, or even off-idle operation, as a means for running the engine with greater efficiency.

It is an object of the present invention to provide a tunable intake manifold system which has the capability of rapidly responding to changes in engine operating parameters.

It is an advantage of the present invention that an electronically tuned intake manifold according to this invention may be operable either by a stand-alone electronic processor or by a computer used to control spark timing, exhaust gas recirculation (EGR), fuel injection, or other operating parameters of the engine.

It is yet another advantage of the present invention that a supercharging system according to the present invention will completely avoid parasitic losses when the system is not in operation. This feature is important because traditionally supercharger systems have absorbed power from the engine at all times—e.g., even when supercharging is not required or desired.

Other objects, features and advantages of the present invention will become apparent to the reader of this specification.

SUMMARY OF THE INVENTION

An electronically controlled intake manifold system for an internal combustion engine includes an intake manifold for conveying charge air to each of the cylinders of the engine, an electronically driven pressure pulse generator operatively connected with the manifold for the purpose of producing pressure pulses within the manifold at one or more frequencies related to an operating parameter of the engine and a processor using at least one operating parameter of the engine to generate a signal for driving the pressure pulse generator. The intake manifold may comprise a common plenum for supplying charge air to the cylinders, with the pulse generator being positioned and acoustically coupled so as to act upon air passing through the plenum. Alternatively, the intake manifold may comprise a common plenum for supplying a portion of the charge air required by each of the cylinders, with a branched array for supplying the remainder of the charge air, with the branched array being acted upon by the pulse generator such that pressure pulses are generated in air passing through the array.

Yet another alternative encompasses the notion that all of the air passing through the engine may flow through a branched array which is acoustically coupled to the pulse generator.

According to another aspect of this invention, the processor which operates the electronically driven pressure pulse generator will determine the phase frequency, and magnitude of the pressure pulses. In so doing, the processor may use information from the engine's firing frequency, speed, load, spark timing, fuel injection pulse width and timing, and exhaust gas recirculation rate.

A pressure pulse generator for use with a system according to the present invention preferably comprises a diaphragm which is driven electromagnetically by a processor so that each intake event of the engine is accompanied by the arrival of a pressure pulse at an intake port through which air is being inducted into a cylinder. The processor, as noted above, may comprise either a free-standing unit dedicated to the operation of the pressure pulse generator or may comprise an engine control computer for operating the spark ignition system, fuel injection system or other engine system.

According to another aspect of the present invention, a method for supercharging an internal combustion engine comprises the steps of periodically sampling an operating parameter of the engine, generating a control signal based on the sampled parameter, and using the control signal to modulate the operation of an electronically driven pressure pulse generator which is acoustically coupled to the intake manifold of the engine.

DETAILED DESCRIPTION OF THE PREFERRED EMBODIMENTS

As shown in the various figures, an electronically tuned intake manifold according to the present invention is intended to be used with an internal combustion engine which may have more than one cylinder. Although four cylinder embodiments are illustrated, the present invention may be used with engines having various numerous of cylinders, including the familiar 4, 6 and 8 vee and in-line configurations and yet other configurations known to those skilled in the art. Furthermore, the present invention may be employed with not only spark ignition but also diesel engines and variants of conventional spark and diesel engines.

Figure 1:
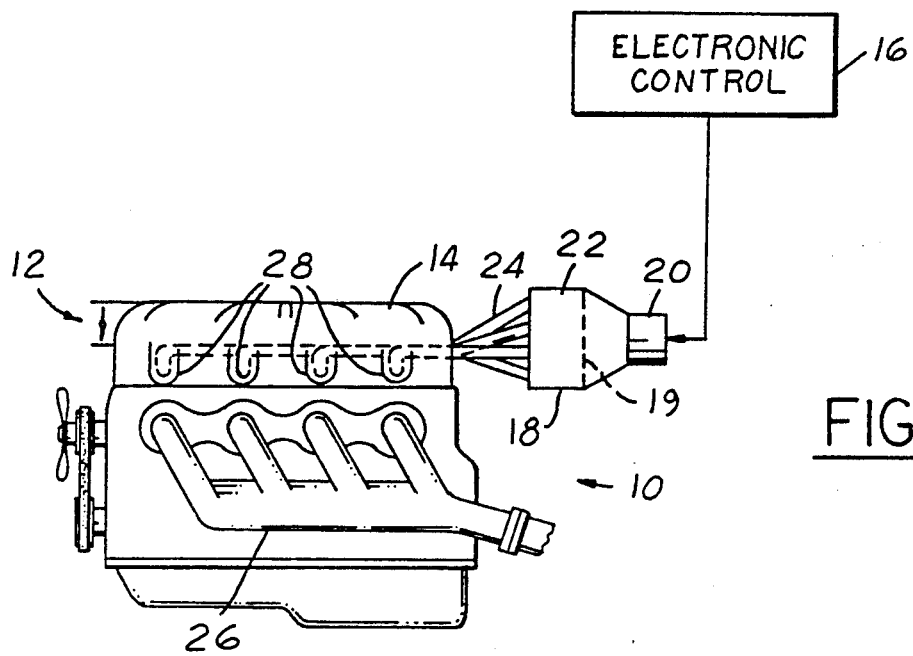
FIG. 1 illustrates a first embodiment of the present invention which an electronically driven pressure pulse generator acts upon a portion of the air passing into the engine cylinders by means of a branched array, which is acoustically coupled with the pressure pulse generator.

FIG. 1 illustrates a first embodiment of the present invention in which an engine 10 having an intake throttle, 12, leading to an intake plenum, 14, draws air through a plurality of intake ports, 28, into the engine's cylinders. Although a single intake port 28 is illustrated for each of the cylinders, those skilled in the art will appreciate in view of this disclosure that a system according to this invention could be used with multiple ports and inlet valves. In the case of engines having multiple inlet valves and associated intake ports for each cylinder, a system according to this invention could be applied to only one, or more, of the ports. After being processed by the engine, spent gases are vented into the atmosphere by means of an exhaust manifold, 26, in a conventional manner.

Each of the embodiments illustrates an electronic control, 16, which includes a processor for sampling information relating to at least one operating parameter of the engine. The processor generates a signal for driving the pressure pulse generator 18 through a suitable driver circuit known to those skilled in the art and suggested by this disclosure. The pressure pulse generator is operated by a motor, 20, which may comprise a coil, such as a voice coil, for driving a diaphragm, 19, electromagnetically. Those skilled in the art will appreciate in view of this disclosure that other types of transducers, in addition to voice coil driven diaphragms, could be employed according to the present invention. For example, electrostatically driven transducers, such as an air modulation transducer, or other types, could be used.

The three illustrated embodiments show different arrangements for both supplying air to the intake ports 28 and for providing the supercharging effect of pressure pulse generator 18. In FIG. 1, a portion of the air fed to each of intake ports 28 is supercharged by pressure pulse generator 18 acting upon a branched array, 24, which is acoustically coupled with amplification chamber 22. A processor within an electronic control 16 times the pulses created by transducer 18 so that the pulses will pass down the various branches of branched array 24 so that each intake event of the engine will be accompanied by the arrival of a pressure pulse at an appropriate intake port 28. The present system offers considerably flexibility in terms of its control strategy inasmuch as the electronic control may be programmed to respond to a variety of engine operating parameters, such as engine speed, load, spark timing, fuel injection pulse width and timing and exhaust gas recirculation (EGR) rate. For example, by monitoring spark timing and engine speed, the controller may operate pressure pulse generator 18 to produce acoustic pulses within the intake manifold, including plenum 14 and branched array 24, at one or more frequencies relating to the firing frequency of the engine. By way of further example, diaphragm 19 could be driven electromagnetically at a frequency which approximates a whole number multiple of the firing frequency of the engine.

If engine load, as measured by intake manifold pressure or throttle opening or some other measure, is used as an input operating parameter for the control of transducer 18, the amplitude of the signal fed to the transducer could be increased in value at higher engine loads and decreased to a lower value, if not zero, at idle. Similarly, fuel injection pulse width, which is an indicator of engine output could be employed for the purpose of modulating the operation of pressure pulse generator 18. Those skilled in the art will realize that other parameters, in combination with parameters such as inlet valve timing information, could be used in combination with the previously discussed parameters for the purpose of governing the phase, amplitude, and frequency of the pressure pulse generator.

As previously noted, FIG. 1 illustrates a first embodiment of the present invention in which a portion of the charge air required by each of the engine cylinders is provided by common plenum 14, with branched array 24 providing the remainder of required air. Note that the branched array in the embodiment of FIG. 1 has no outside air inlet. As a result, all air passing from the branched array into intake ports 28 must originate from plenum 14. Accordingly, the array is refilled whenever the manifold itself fills in normal fashion. Electronic control 16 operates motor 20 and diaphragm 19 so as to generate pressure pulses which are amplified by amplification chamber 22 and which then pass into array 24. Electronic control 16 adjusts the frequency, phase and amplitude of the control signals being output to motor 20 so that each intake event of the engine is marked by the arrival of a pressure pulse, whether superatmospheric or subatmospheric, at the particular intake port which is opened by a valve. Although no engine valves are shown in any of the figures, the system according to the present invention is compatible with a variety of valve structures, such as poppet valves, reed valves and other valves known to those skilled in the art and suggested by this disclosure.

Figure 2:
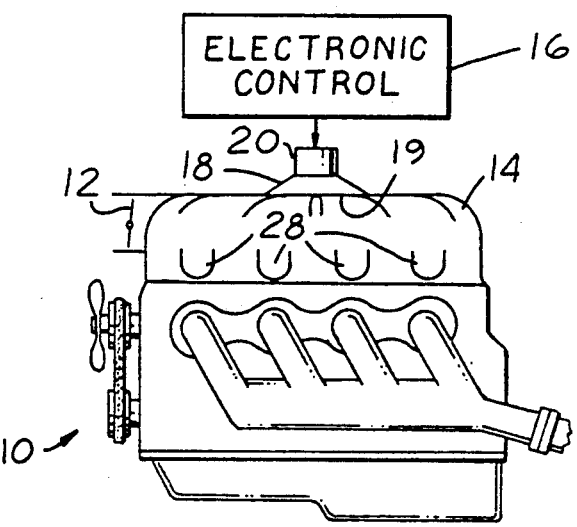
FIG. 2 illustrates a second embodiment of the present invention in which the pressure pulse generator is acoustically coupled to a plenum inlet chamber so as to act upon substantially all of the air passing into the engine cylinders.

FIG. 2 shows a second embodiment of the present invention in which all of the combustion air is provided by a common plenum, 14, which is filled through throttle valve 12. In this embodiment, diaphragm 19 is coupled directly to plenum 14. The operation of the system is substantially the same as that explained in connection with the embodiment of FIG. 1. As before, electronic control 16 samples inputs from a variety of sensors (not shown), relating to manifold absolute pressure, spark timing, fuel injection timing and pulse width, EGR rate and other parameters. The controller then determines the appropriate phase and magnitude for the control signal to be supplied to motor 20 and operates transducer 18 accordingly. Those skilled in the art will appreciate in view of this disclosure that a system according to the embodiment shown in FIG. 2 could be used with a plurality of transducers 18. For example, a single transducer could be employed with each cylinder, or with a pair of cylinders, or according to some other scheme.

Figure 3:
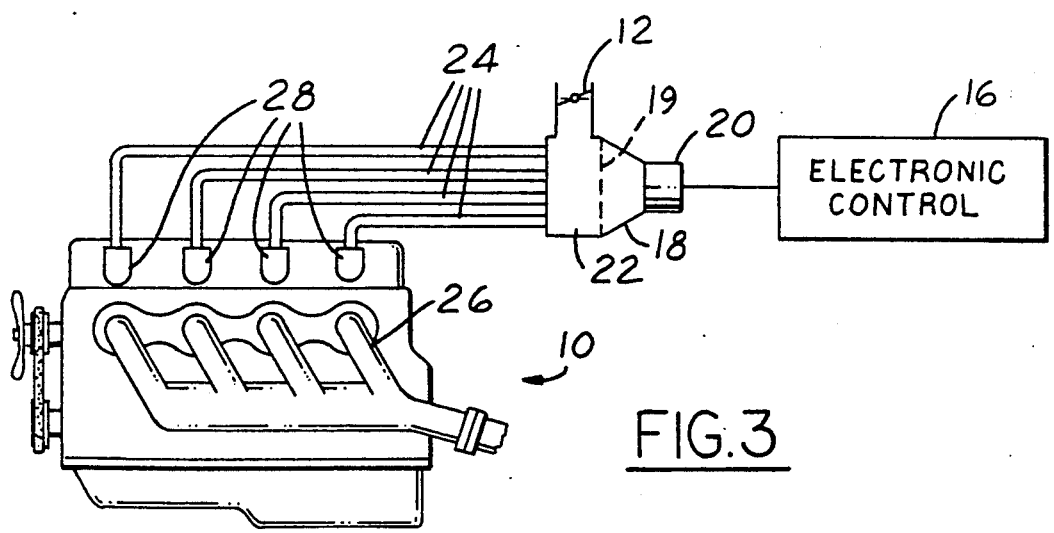
FIG. 3 illustrates a third embodiment of the present invention in which a pressure pulse generator acts upon the air passing into an engine's cylinders through a branched array.

FIG. 3 shows yet another embodiment of a system according to the present invention. In this last figure, all of the air passing to the engine cylinders is provided by branched array 24. Note that the air is admitted into the branched array from the amplification chamber by way of throttle valve 12. Air passing initially through throttle valve 12 and amplification chamber 22 is acted upon by pressure pulses created by transducer 18 and then passes through the various branches to the engine's cylinders. Electronic control 16 determines the phase and amplitude of the signal issued to transducer 18 by means of a sampling of one or more engine operating parameters on a periodic basis and by generating the control signal to be supplied to the transducer and then by using the control signal to modulate the operation of the pressure pulse generator or transducer. Because a system according to the present invention obviates the need for a mechanical supercharger drive including rotating machinery, this system offers great flexibility. For example, as explained below, the system may be deactivated or controlled to produce subatmospheric pressure pulses during certain modes of engine operation such as idling, deceleration, or low power operation. This system may receive inputs from not only the previously described operating parameters but also, for example, a knock sensor. Thus, when engine knock is sensed, the supercharging effect may be adjusted to move the engine away from knocking operation.

As noted in the introductory material of this specification, one aspect of the present invention relates to the concept of subcharging, in which the effective pressure within the intake manifold is depressed to a subatmospheric level in the region of the intake ports. This mode of charge air control may be desirable during engine idle, or even off-idle operation, as a means for running the engine with greater efficiency and with reduced induction noise. Subcharging with a system according to the present invention produces an effect which is similar to reducing the compression ratio of the engine, but reversibly and controllably, so that the engine may be operated at a subcharged, lower effective compression ratio whenever less power is needed, and at its nominal compression ratio when a middle range of power is required, and at a supercharged, higher effective compression ratio when maximum power output is desired.

While the invention has been shown and described in its preferred embodiments, it will be clear to those skilled in the arts to which they pertain that many changes and modifications may be made thereto without departing from the scope of the invention. For example, a system according to the present invention could be employed with unthrottled engines, such as certain diesel engines.

We claim:

1. An electronically controlled intake manifold system for an internal combustion engine, comprising:
    an intake manifold for conveying charge air to each of the cylinders of said engine;
    an electronically driven pressure pulse generator operatively connected with said manifold for the purpose of producing pressure pulses within the manifold at one or more frequencies related to an operating parameter of the engine; and
    a processor using at least one operating parameter of the engine to generate a signal for driving said pressure pulse generator.

2. An intake manifold system according to claim 1, wherein said intake manifold comprises a common plenum for supplying charge air to said cylinders, with said pulse generator being positioned so as to act upon the air passing through said plenum.

3. An intake manifold system according to claim 1, wherein said intake manifold comprises a common plenum for supplying a portion of the charge air required by each of said cylinders, and a branched array for supplying the remainder of said charge air, with the branched array being acted upon by said pulse generator such that pressure pulses are generated in the air passing through the array.

4. An intake manifold system according to claim 1, wherein said intake manifold comprises a branched array which is acted upon by said pulse generator such that pressure pulses are generated in the air passing through said branched array.

5. An intake manifold system according to claim 1, wherein said pressure pulse generator produces acoustic pulses within the manifold.

6. An intake manifold system according to claim 1, wherein said pressure pulse generator produces acoustic pulses within the manifold at one or more frequencies related to the firing frequency of the engine.

7. An intake manifold system according to claim 1, wherein said processor uses spark timing information to determine the operation of said pressure pulse generator.

8. An intake manifold system according to claim 1, wherein said processor uses spark timing and firing frequency information to determine the operation of said pressure pulse generator.

9. An intake manifold system according to claim 1, wherein said processor uses valve timing information to determine the operation of said pressure pulse generator.

10. An intake manifold system according to claim 1, wherein said processor uses valve and spark timing information to determine the operation of said pressure pulse generator.

11. An intake manifold system according to claim 1, wherein said processor uses engine load information to determine the operation of said pressure pulse generator.

12. An intake manifold system according to claim 1, wherein said pressure pulse generator comprises a diaphragm actuated by a motor which is operated by said processor.

13. An intake manifold system according to claim 1, wherein said pressure pulse generator is driven such that each intake event of the engine is accompanied by the arrival of a pressure pulse at an intake port through which air is being inducted into a cylinder.

14. An intake manifold system according to claim 1, wherein said processor controls the frequency, magnitude, and phase of the pressure pulses produced by said generator.

15. An intake manifold system according to claim 1, wherein said generator is controlled so as to produce a subatmospheric pressure pulse at an intake port through which air is being inducted into a cylinder.

16. An intake manifold system according to claim 1, wherein said said generator is controlled so as to produce a superatmospheric pressure pulse at an intake port through, which air is being inducted into a cylinder.

17. An electronically controlled intake manifold system for an internal combustion engine, comprising:
 an intake manifold for conveying charge air to each of the cylinders of said engine;
 an electronically driven pressure pulse generator comprising a diaphragm which is operatively connected with said manifold for the purpose of producing pressure pulses within the manifold at one or more frequencies related to an operating parameter of the engine; and
 a processor using at least one operating parameter of the engine to generate a signal for driving said diaphragm.

18. An intake manifold system according to claim 17, wherein said diaphragm is driven electromagnetically.

19. An intake manifold system according to claim 17, wherein said diaphragm is driven electromagnetically at a frequency which approximates a whole number multiple of the firing frequency of the engine.

20. An intake manifold system according to claim 17, wherein said diaphragm is driven such that each intake event of the engine is accompanied by the arrival of a pressure pulse at an intake port through which air is being inducted into a cylinder.

21. An electronically controlled intake manifold system for an internal combustion engine, comprising:
 an intake manifold for conveying charge air to at least one intake port associated with each of the cylinders of said engine;
 an electronically driven pressure pulse generator comprising a diaphragm which is operatively connected with said manifold and which acts upon air passing through the manifold to produce pressure pulses within such air; and
 a processor using at least one operating parameter of the engine to generate a signal for driving said diaphragm such that each intake event of the engine is accompanied by the arrival of a pressure pulse at an intake port through which air is being inducted into a cylinder.

22. An intake manifold system according to claim 21, wherein said internal combustion engine comprises a spark ignition engine, and said processor further comprises an electronic engine control computer for determining the spark timing of said engine.

23. An intake manifold system according to claim 21, wherein said internal combustion engine is equipped with a fuel injection system, and said processor further comprises an electronic engine control computer for operating said fuel injection system.

24. A method for controlling the charge air pressure of an internal combustion engine, comprising the steps of:
 periodically sampling an operating parameter of said engine;
 generating a control signal based on said sampled parameter; and
 using said control signal to modulate the operation of an electronically driven pressure pulse generator acoustically coupled to the intake manifold of said engine.

25. An electronically controlled intake manifold system for an internal combustion engine, comprising:
 an intake manifold for conveying charge air to each of the cylinders of said engine;
 an electronically driven pressure pulse generator operatively connected with said manifold for the purpose of producing pressure pulses within the manifold at one or more frequencies related to an operating parameter of the engine; and
 a processor using at least one operating parameter of the engine to generate a signal for controlling the frequency, amplitude, and phase of said pressure pulse generator so that the engine may be operated at a subcharged, lower effective compression ratio whenever less power is needed, and at its nominal compression ratio when a middle range of power is required, and at a supercharged, higher effective compression ratio when maximum power output is desired.

* * * * *